Aug. 22, 1967 D. M. DAHM 3,337,851

MEMORY ORGANIZATION FOR REDUCING ACCESS TIME OF PROGRAM REPETITIONS

Filed Dec. 9, 1963 2 Sheets-Sheet 1

INVENTOR.
DAVID M. DAHM

Aug. 22, 1967 D. M. DAHM 3,337,851

MEMORY ORGANIZATION FOR REDUCING ACCESS TIME OF PROGRAM REPETITIONS

Filed Dec. 9, 1963 2 Sheets-Sheet 2

INVENTOR.
DAVID M. DAHM

United States Patent Office 3,337,851
Patented Aug. 22, 1967

3,337,851
MEMORY ORGANIZATION FOR REDUCING ACCESS TIME OF PROGRAM REPETITIONS

David M. Dahm, Pasadena, Calif., assignor to Burroughs Corporation, Detroit, Mich., a corporation of Michigan
Filed Dec. 9, 1963, Ser. No. 328,848
12 Claims. (Cl. 340—172.5)

Figure 1:
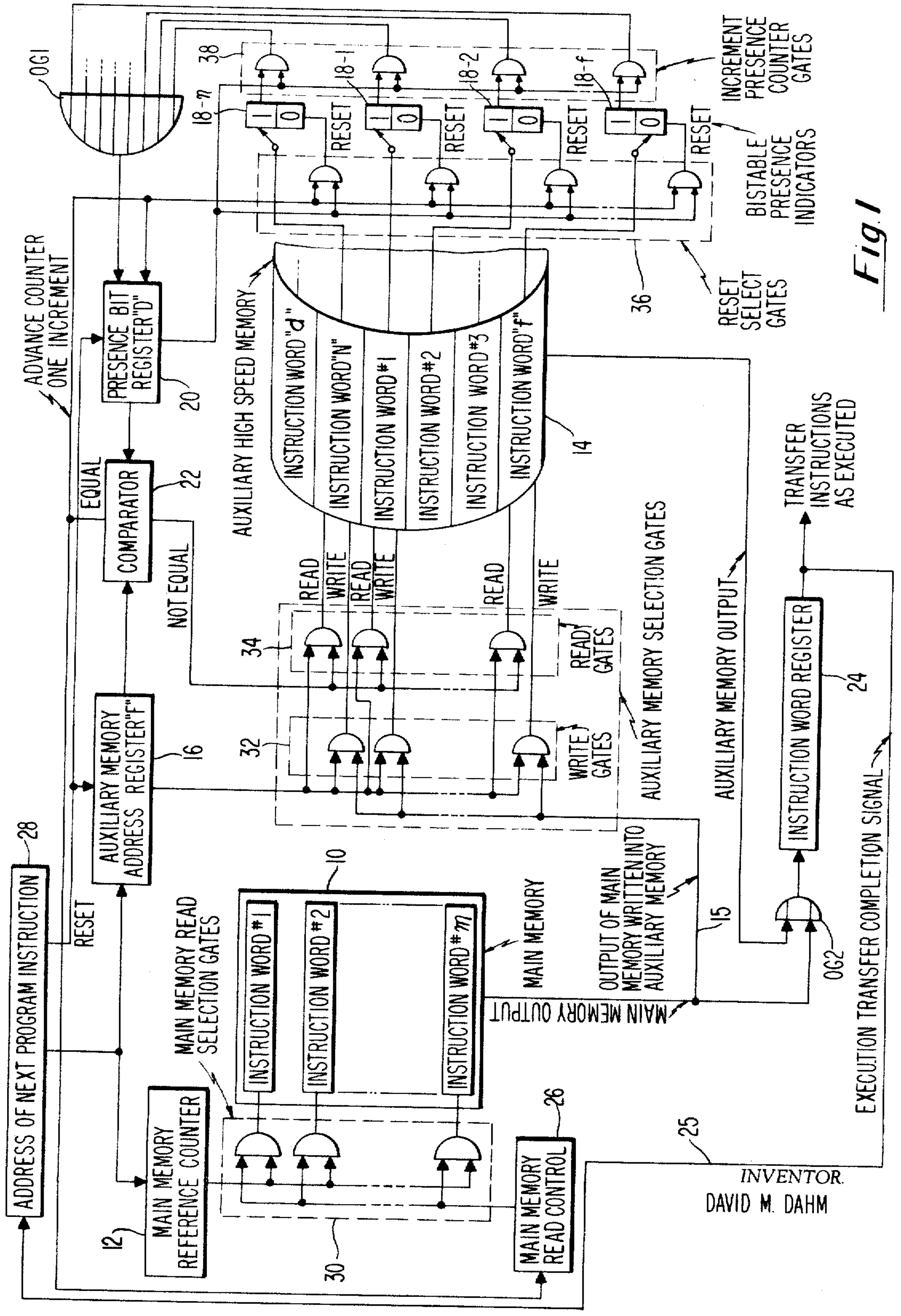

The present invention relates to memory or storage devices in digital computers for reducing program execution time.

More particularly, the invention relates to the reduction of memory access time for iterative memory requests by the use of a small high-speed auxiliary memory in conjunction with a larger, slower-speed main memory. All information read out of the slower-speed main memory is simultaneously written into the high-speed auxiliary memory. Thereafter, any iterative recycling of the program which requests information contained in the higher-speed auxiliary memory will be satisfied from this faster memory. In this way, all recently-repeated memory requests will have an access time equal to the faster-operating auxiliary memory rather than that of the main memory.

The overall improvement in execution time is dependent upon the number of repeated requests contained in the program and the relative access speeds of the main and auxiliary memories.

In the past, the execution time required to process a computer program was directly related to the access time of the main memory of the particular computer. This was true regardless of the number of repeated memory requests contained in the program. Thus, even though the program contained a string or series of identical memory location requests, each request was treated as its predecessor and required the main memory to locate and issue the particular instruction as though it were an original request. As a consequence, the main memory access time was an inherent part of any request in any program. Thus, the total memory access time of any program was merely the number of requests multiplied by this inherent main memory access time.

It is well known in the digital computer field that a computer program, especially in the case of a scientific computer, will contain a great number of iterative memory instruction requests.

It is equally well known that a desired feature in any computer is a large-capacity main memory. As would be expected, the access time required for a memory to locate and issue a particular piece of information is a direct function of the information capacity of the memory.

It is seen, therefore, that a computer having a large-capacity main memory will consequently possess a longer access time. This longer access time will be an inherent part of any computer program and is required to satisfy either an initial or a repeat memory request.

While attempts have been made to overcome this delay in memory access for repeated memory requests, past solutions have usually relied on the program itself to circumvent this difficulty. That is, the programmer at the time of the writing of the program would be required to recognize an iterative memory request and by manipulation of the program itself would incorporate variations to accommodate the request in another way.

This solution, of course, has obvious difficulties. For example, the programmer must initially recognize the program iteration. Secondly, any program manipulation by the programmer is a fixed solution to the recognized difficulty. Thus, if the repetition is not discovered by the programmer, it will never be overcome by the program. Further, if the recognized repetition should change location in the program because of some branch deviation by the computer during program execution, the fixed manipulation would be defeated.

Another of the solutions suggested was known as the "look ahead" device. In this scheme, the program is probed along its "normal" execution path by an "advance" probing device. This device is used in conjunction with an auxiliary memory means having the usual higher-speed, lower-capacity characteristics.

As the program was being executed, the "advance" probe would determine if the instruction being executed was to be repeated in the near future. If it was, the prober caused the instruction upon conclusion of its present execution to be returned to the higher speed memory rather than the large storage device. In this way, when the repeated request was made by the program, the instruction was issued from the auxiliary memory. While the explanation is straightforward, the device is not so simple.

In addition to the extra circuitry required to instrument the "advanced" probe, there was the additional problem of erroneous probing. This is quite natural since it is not possible for the probing circuitry to predict the program execution path. It is well known in the field of data processing that it is impossible to correctly predict the path that a computer will take to comply with a given instruction. While it is possible to usually predict the solution, it is far from error-proof.

This invention provides a memory organization and the accompanying means to reduce the access time of a memory request when such request is repeated at frequent intervals. It also provides a method of utilizing this organization and means to accomplish this reduction in retrieval time.

It is therefore a primary object of this invention to provide a method and a means of reducing memory access time for repeated memory requests which does not rely on the machine program.

It is also an object of this invention to provide a means of reducing memory access time for repeated memory requests which cannot be defeated by sudden unforeseen changes in the program execution path.

It is a further object of this invention to provide a means of reducing memory access time for repeated memory requests which is not restricted to any particular computer, but which can be easily integrated into any computer memory organization.

It is a still further object of this invention to provide a means of reducing memory access time for repeated memory requests which dynamically adjusts itself to any program that may be put on the computer.

It is a still further object of this invention to provide a means of reducing memory access time in the case of repeated instructions in which a group of the most recent instructions are stored in the order of their original execution in an auxiliary high-speed memory.

Figure 2A:
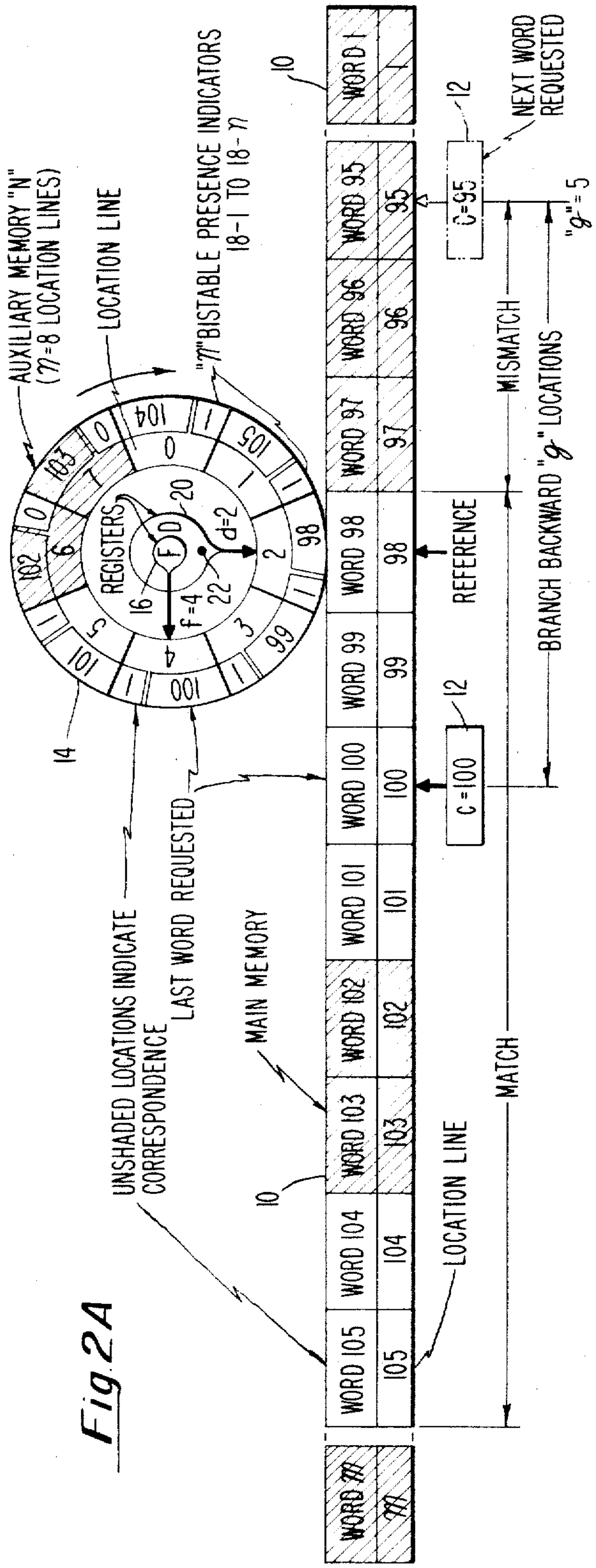
Figure 2B:
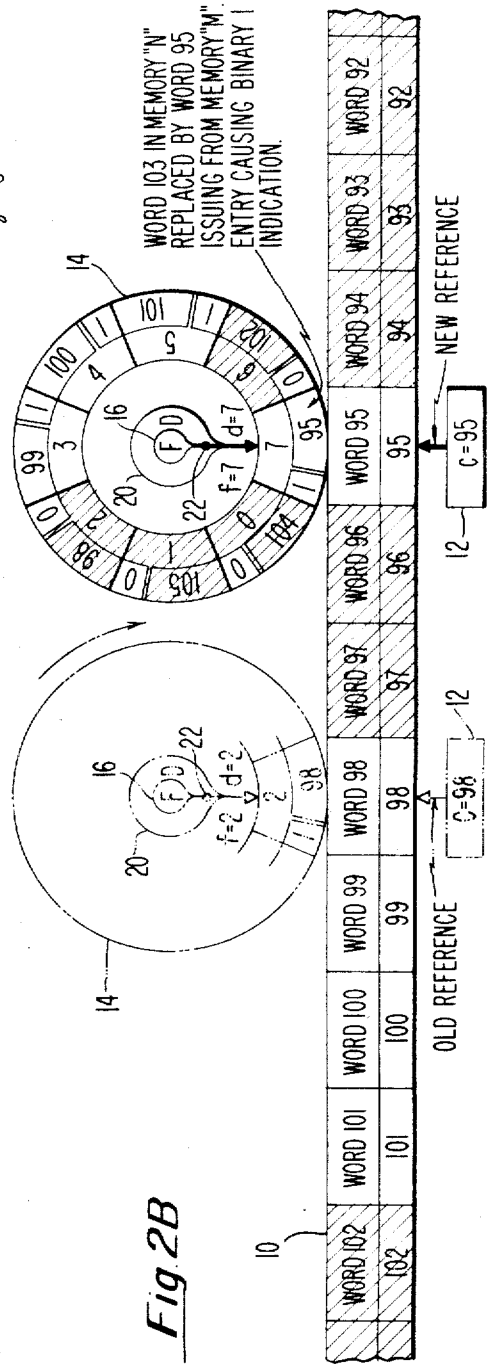

The features of the invention which are believed to be novel are set forth with particularity in the appended claims. The invention itself, however, both as to its organization and method of operation, together with further objects and advantages thereof, may best be understood by reference to the following description when taken in connection with the drawings wherein:

FIGURE 1 is a block diagram of a preferred embodiment of the memory organization when utilized in a data processing memory;

FIGURES 2*a* and 2*b* are operational block diagrams of the memory organization showing its position before and after performing an auxiliary memory operation.

Referring particularly to FIGURE 1, a main memory counter 12 is coupled to a main memory 10 having *m* lines. The memories shown, and preferred, are random-access, line-select, word-organized types. The reference counter 12 registers the selected or addressed line of the *m* lines of the main memory 10. Consequently, it may also be referred to as an address register.

A smaller, faster speed, auxiliary memory 14 having *n* lines is provided (where $m \gg n$). An interconnection 15 between the selected output of main memory 10 and the selected input of the auxiliary memory 14 is provided to write into the selected line of the auxiliary memory all word transfers read from main memory 10.

The auxiliary memory 14 is also of the word-organized, line-addressed type. It has coupled to it an auxiliary memory reference counting means 16 which addresses the selected line of the *n* lines in the auxiliary memory 14 and causes the information therein to be read out. It may also be referred to as an address register 16.

On *n* plurality of bistable devices 18–1 to **18–*n*, of any convenient type, e.g. flip-flops, word bits, are coupled to the correspondingly numbered locations of the auxiliary memory 14. Each of binary devices 18–1 to 18–*n*** is activated by the entry of a word into the corresponding word location (1 to *n*) of auxiliary memory 14. Each bistable device indicates a binary output signal 1 when activated by a word entry; otherwise it indicates a binary 0. These bistable devices are hereinafter referred to as presence bit indicators 18–1 to **18–*n*** to more clearly explain their function.

A presence bit counter 20 is coupled to and activated by the output signal of OR gate OG1. This counter is used as a reference address register and may be referred to as such. The binary 1 outputs of all presence bit indicators 18–1 to **18–*n*** are coupled to the input of OR gate OG1.

A comparator circuit 22 compares the address contents of the auxiliary memory register 16 with the contents of the presence bit reference register 20 and issues an output signal when the two registers are equal. This signal occurs whether register 16 passes register 20 from either direction; that is, counting up or down.

The equality output signal from comparator 22 activates main memory read control 26, enabling the memory request to be satisfied from the word location of the main memory 10 as selected by main memory address register 12. The selected output is coupled through OR gate OG2 into the instruction register 24. Normally, no output signal is present and the instruction register 24 is usually connected to receive the output of auxiliary memory 14. However, upon activation by the presence of an equality output signal from the comparator 22, the control device 26 causes the requested word to be read from the main memory 10.

The instruction register 24 receives, temporarily stores, and transfers for execution all memory word transfers. A completion signal from register 24 is returned to an order register 28 through interconnection 25 to indicate the readiness of register 24 for the next word transfer. The program instruction register 28 contains the address of the next memory instruction and, upon receipt of the completion signal from register 24, simultaneously issues the next address to the main memory address register 12 and the auxiliary address register 16. An example of the handling of a typical order may be to jump or branch backward 20 address locations and repeat the last 20 sequential instructions.

If it is assumed that the number of *n* locations in the auxiliary memory exceeds 20 and that this is the first repeat or branch order, then the words are available in the auxiliary memory 14. Since each new instruction is initially read from the main memory 10 and each issuance by memory 10 is written into memory 14, then memory 14 contains the words and they are read from there into the instruction register 24. The following detailed description should satisfactorily explain the memory cycle.

Originally, all presence bit indicators 18–1 to **18–*n* are reset to indicate their binary 0 output to thereby indicate a complete lack of correspondence between memories 10 and 14**.

The auxiliary register 16 and the presence bit register 20 are recycled or reset; for example, both registers addressing location 1. Comparator 22 will indicate this equality by issuing an output signal.

This equality signal from comparator 22 is applied to three places simultaneously:

First, it activates read control device 26 to enable the requested memory information to be read out of the main memory 10.

Next, it increments the presence bit register 20 by one location. Thus, each time the auxiliary register 16 attempts to pass the reference register 20 in either the plus or minus direction, the reference address register is stepped one location ahead of the auxiliary address register.

Finally, it assures that the presence binary indicator associated with the prior referenced address is reset to receive a new word transfer.

The activation of the read control device 26 will cause the read selection AND gates 30 to be set. The AND gate also receiving an address signal from address counter 12 will cause the issuance of the contents of the selected word location from the main memory 10.

The contents of the addressed word location are transferred from the main memory 10 to OR gate OG2, and the interconnection 15 will enable the transferred word to be simultaneously written into the location of the auxiliary memory 14 addressed by register 16. The entry of this word into the address line of auxiliary memory 14 activates (sets) the presence bit indicator, associated with that location, to its binary 1 output, thereby indicating the presence of a word in that location. The auxiliary memory 14 will continue to receive such word transfers until it has reached its capacity (1 through *n*). Thereafter, new transfers will replace earlier ones, since, in effect, the auxiliary memory is an end around device. Thus, the auxiliary memory will contain only the *n* latest transfers from the main memory 10. Requests for any of these words will be satisfied by the auxiliary memory 14 rather than from memory 10 and will consequently have the access time associated with the high-speed auxiliary memory rather than the low-speed main memory.

The device is illustrated to its prime advantage when taking into account control changes other than normal sequencing. That is to say, when man memory reference counter 12 is changed by more than +1 in response to the next program instruction address 28.

The two relevant situations are forward and backward branching. Operation in both cases is similar, so only one will be discussed in detail. Since a backward step must initiate the use of the device, backward branching shall be discussed first.

Refer to FIGURE 2*a* where there is shown an operational block diagram of the present device. In a backward jump the number of locations to be traversed must fall into one of not more than three categories so far as the auxiliary memory is concerned. In the initial situation, where the address and reference registers 16 and 20 have been sequentially counting forward, loading or replacing information into the auxiliary memory 14, there are only two categories. These are, of course, within or without the memory location capacity *n*. Thus, if *g* is specified as the location gap to be jumped backward, it may be less than, equal to, or greater than *n*. Mathematically, this may be set forth as:

(1) $g \leq n$, then correspondence exists between the addressed contents of the large and small memories, satisfy request from small memory.

(2) $g > n$, correspondence does not exist between the addressed locations, satisfy from large memory and place the satisfying information in the small memory location addressed. Reset all presence indicators and reset reference address register to restart point.

For purposes of explanation, consider that the backward gap is within the range of the auxiliary memory. Further, for ease of calculation, assume that it is $n/2$ locations. Thus, the request is satisfied from the small memory and the next request is awaited.

If the number of skipped locations in the next request is specified as $g$ and the present F register 16 addressed location is $f$, then the new location is $f-g$. Thus $g$ is the number which must be subtracted from the present address $f$, indicated by register 16, to arrive at the new location.

The number of locations ($g$) to be skipped backward must fall into one of three possible categories for this request. They are:

(1) $g$ is equal to or less than the number of locations $A(f)$ between the address presently indicated by register F, referred to hereinafter as $fp$, and the present reference address indicated by register D and referred to as $dp$.

(2) $g$ is greater than the number of locations between addresses $fp$ and $dp$ or $A(f)$; but equal to or less than that number of locations $A(f)$ added to $n$, the total number of locations in the auxiliary memory N.

(3) $g$ is greater than the sum of $n$ locations added to $A(f)$ locations.

These three conditions may be respectively stated mathematically to accomplish the following results:

(1) $g \leq Af$. If this is the case, then subtract $g$ from the address ($fp$) contained in F and restore the result into register F. Since the reference register D, 20 has not been changed and no new word insertions are necessary, presence bits 18–1 to 18–$n$ remain unchanged to indicate correspondence at any location having a binary 1.

(2) $A(f) < g \leq A(f)+n$. If this is the condition, the number of backwardly-skipped locations specified by $g$ have passed the present reference address $fp$ originally specified, causing it to shift to a new reference location $f(n)$. Each location passed through by the reference register will have its presence bit reset to thereby indicate mismatching or noncorrespondence between selected words of M and N. The addressed word is satisfied from M memory.

(3) $A(f) = n < g$; in this last category, the number of $g$ locations completely passes through and beyond the auxiliary memory capacity N, thereby making satisfaction of any future request impossible as far as the auxiliary memory is concerned. In this instance, all $n$ locations of the memory N have their presence indicators reset and a complete new set of $n$ transfers start into the memory N as they transfer out of the memory M to satisfy initial requests. Also, registers F and D have their address $f$ and $d$ reset to 0.

An example may clarify this. Referring to FIGURES 2*a* and 2*b*, the memory N is shown as a rotary device operating along memory M. Registers F and D are centered in memory N. Register F indicates an address of $f=4$, and register D, an address of $d=2$. Memory N is placed adjacent to M at the reference location of register D and corresponding locations of memory M in the figure, operatively illustrate location correspondence. Thus, the six memory N locations $n=0$ to $n=5$ have information corresponding to that contained in memory M locations M104, M105, M98, M99, M100 and M101, respectively. The binary notations in the corner of each segment of N are referred to as presence indicators. A binary 1 indicating corresponding word presence and a binary 0, absence or noncorrespondence between aligned locations of M and N.

In the example shown in FIGURE 2 a backward jump of 5($g=5$) is specified.

Reference to the three categories will indicate that $g=5$ is therefore greater than $A(f)$, since $A(f)=fp-dp$ or $4-2=2$, but less than $A(f)+n=2+8=10$. Therefore, the new location $fn$ of register F is $g$ subtracted from its present $fp$ address or $4-5=-1$. As previously noted, the circular operation prevents negative numbers thereby adding a modulo 8 to the number or $fn=-1+8=7$. Correspondence cannot exist at this location since the reference location has been passed and reference to the presence bit of this location will denote a binary 0 to evidence such a mismatch. Consequently, the word is read from the main memory M location as specified by register C contents $c-g$. Since $c=100$ and $g=5$ the location requested is 95.

Reference to FIGURE 2*b* will illustrate the new state of the memory organization. Execution of the instruction increments $f$ and $d$ addresses by $+1$; but since $f=d$ prior to the execution, they still indicate equality. The binary 0 indicated by the segment denotes the fact that the reference register has passed the segment creating a mismatch. The read control 30 of memory M in FIGURE 1 is notified of such mismatch and it causes issuance of the word from the M memory.

A forward branching request will be practically identical to the above description, with the only difference being the direction from which the register F contents $f$ approaches the contents $d$ of reference register D. However, passing reference address $d$ of register D in either direction by address $f$ of register F will cause a change in the reference address. As each location is passed by the pair of registers D and F, the binary device associated with the passed location will be reset to zero, indicating a loss of correspondence.

Obviously, many modifications and variations of the present invention are possible in the light of the above teachings. It is also understood that the illustrated *rotary* form of memory 14 is only for ease of understanding and that a thin-film or other rapid access memory is within my concept. It is, therefore, to be understood that within the scope of the appended claims the invention may be practiced other than as specifically described and illustrated.

What is claimed is:

1. A memory organization for improving access time for repeated memory requests comprising a large-capacity, slow-operating main memory means and a smaller, faster-operating auxiliary memory means, each of said memory means having an addressing register connected to activate selected contents of said memories, both of said registers being commonly connected to a single source of address instructions for simultaneous and synchronous location counting of said memories, a single execute instruction register switchably connected to a selected one of said memories to receive the selectively activated contents therefrom, an interconnecting means between said memories to enter into said auxiliary memory means the selectively activated contents of said main memory means when said main memory means is connected to said execute instruction register, a correspondence indicating means associated with said auxiliary memory means to cause said execute instruction register to receive the selected contents of said auxiliary memory means rather than from said main memory means when correspondence exists between the selected contents of said main and auxiliary memories.

2. The memory organization as set forth in claim 1 wherein both of said memories are random-access, line-selected and word-organized, said main memory means having $m$ word lines and said auxiliary memory means having $n$ word lines wherein $m >> n$.

3. The memory organization as set forth in claim 1 wherein said correspondence indicating means includes a reference register connected to said auxiliary memory means and responsive to the transfer of the activated contents of the selected one of $m$ lines of the main memory into said one of said $n$ lines of said auxiliary memory, and a comparator means connected between said addressing register of the auxiliary memory and said reference register, said comparator means indicating by an output signal the equality of contents between said addressing and reference registers, said equality output signal being connected to actively switch said execute register to receive the selectively activated contents of the main memory.

4. The memory organization as set forth in claim 3 wherein said reference register includes a bistable element associated with each of said plurality of $n$ lines of said auxiliary memory, one state of said bistable element responsive to the entrance of a word transferred into said auxiliary memory from said main memory and the other state of said bistable element responsive to said equality output signal from said comparator.

5. The memory organization as set forth in claim 4 wherein said bistable element is an additional memory bit element on each of the $n$ lines of said auxiliary memory.

6. The memory organization as set forth in claim 5 wherein said binary signal is created by a flip-flop circuit connected to each of the $n$ lines of the auxiliary memory and responsive to the selective line activation of each of said $n$ lines.

7. The memory organization as set forth in claim 6 wherein said bistable element creates a binary 1 and a binary 0 signal state, the binary 1 state of said signal being associated with the entrance of the word into the selected line and the binary 0 state being responsive to the equality signal from said comparator.

8. A memory organization for a digital computer comprising: a main memory means, an auxiliary memory means, of higher operating speed and smaller capacity than said main memory means, coupled to said main memory means to simultaneously receive all information issued from said main memory means for execution, a main memory reference counter associated with said main memory means, an auxiliary reference counter associated with said auxiliary memory means, said respective reference counters being connected together for synchronous operation therebetween and being simultaneously capable of address activating the stored contents of their respective memories, a determining means associated with said auxiliary memory means to initially determine the availability, in said auxiliary memory, of address information recurrently requested for execution by said digital computer, said auxiliary memory determining means being connected to cause said auxiliary memory to satisfy, when available, said recurrent information request, read control means connected to said main memory and responsive to said determining means to cause said main memory to satisfy said recurrently requested information, when not available in said auxiliary memory and a single execute instruction register switchably connected to a selected one of said memory means to receive the requested information therefrom.

9. The combination as set forth in claim 8 wherein said availability determining means includes a plurality of bistable correspondence indicating means, each having a first and second output, said first output occurring when an instruction is present in said location identical to the instruction in a corresponding location of said main memory, and said second output occurring when an instruction is not identical, one of said plurality of bistable indicating means being associated with each location of said auxiliary storage means, a correspondence counting means commonly coupled to receive and count the first outputs of each of said plurality of bistable correspondence means, a counter comparing means coupled between said correspondence counting means and said auxiliary reference counter, said comparing means having a first output of equality to indicate correspondence of the requested instruction in the selected location and a second output of inequality to indicate noncorrespondence of the instruction contents.

10. The combination as set forth in claim 9 wherein said read control means comprises in combination a plurality of read control AND gate means coupled to the locations of said main storage means in conjunction with said main storage reference counting means, each of said read control gate means to cause the issuance of the instruction contained in that selected location as indicated by the main storage reference counting means, when all of said read control means receive and are activated by said equality signal from said comparator.

11. In a data processor having a main storage means, with a program possessing a number of repetitious memory requests among its instructions, and a main storage reference counting means for address activating the locations of said main storage means, the combination, comprising: an auxiliary storage means of higher operating speed and smaller capacity than said main storage means, coupled to receive and store up to its capacity, the most recent output information transfers from said main storage means, an auxiliary storage reference counting means for address activating the locations of said auxiliary storage means in a similar order to said main memory addressing sequence, a correspondence determining means associated with said auxiliary storage means to indicate the existence of correspondence between the addressed locations of said main and auxiliary storage means, a presence determining means to indicate the presence of a word in said corresponding location, and means to satisfy from said auxiliary storage means, requested information residing in the auxiliary storage means.

12. A data processor memory organization comprising: in combination, a first and second random-access, linear-addressed storage means, said first storage means having a much larger storage capacity but a much slower operating speed than said second storage means, a first and a second addressing register respectively connected to address the stored information in said first and second storage means, said addressing to cause the issuance of said information located at said address from one of said storage means, said first and second addressing registers being interconnected to synchronously respond to a single series of addressing instructions, said series including recurring instruction addresses, said first and second storage means being interconnected such that each information transfer from said first storage means in response to one of said series of addressing instructions is automatically stored in said second storage means, a transfer reference address register connected to said second storage means to reference the address therein corersponding to the last information transfer from said first storage means, a comparison means connected between said reference address register and said second address register whereby said information stored in said second storage means correponding to said information stored in said first storage means is issued from said second storage means in response to one of said recurring instruction addresses of said series as indicated by said comparison means, said issuance being from said first storage means when no such correspondence is indicated.

References Cited

UNITED STATES PATENTS

| | | | |
|---|---|---|---|
| 2,995,729 | 8/1961 | Steele | 340—172.5 |
| 3,231,868 | 1/1966 | Bloom et al. | 340—172.5 |
| 3,251,041 | 5/1966 | Chu | 340—172.5 |
| 3,275,991 | 9/1966 | Schneberger | 340—172.5 |
| 3,292,153 | 12/1966 | Barton | 340—172.5 |

ROBERT C. BAILEY, *Primary Examiner.*

M. LISS, J. P. VANDENBURG, *Assistant Examiners.*